United States Patent
Heo et al.

(10) Patent No.: US 8,410,700 B2
(45) Date of Patent: Apr. 2, 2013

(54) ELECTRODELESS LIGHTING SYSTEM AND CONTROL METHOD THEREOF

(75) Inventors: Seok Heo, Seoul (KR); Kyusuk Hwang, Seoul (KR); Sungkyeom Kim, Seoul (KR); Jeongwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 263 days.

(21) Appl. No.: 12/833,232

(22) Filed: Jul. 9, 2010

(65) Prior Publication Data

US 2011/0006683 A1 Jan. 13, 2011

(30) Foreign Application Priority Data

Jul. 10, 2009 (KR) .................. 10-2009-0063179

(51) Int. Cl.
*H05B 41/28* (2006.01)

(52) U.S. Cl. ....... 315/39.51; 315/39; 315/248; 315/291; 315/307

(58) Field of Classification Search .............. 315/39, 315/51, 149, 106, 307, 150, 160, 151, 156–158, 315/291, 39.51, 248
See application file for complete search history.

(56) References Cited

U.S. PATENT DOCUMENTS

| | | | |
|---|---|---|---|
| 5,053,682 A | | 10/1991 | Shoda et al. |
| 5,847,517 A | * | 12/1998 | Ury et al. ............. 315/248 |
| 6,256,016 B1 | * | 7/2001 | Piot et al. ............. 345/166 |
| 6,265,830 B1 | * | 7/2001 | Bretmersky et al. ...... 315/106 |
| 6,577,074 B1 | * | 6/2003 | Ervin et al. ............ 315/248 |
| 7,049,764 B2 | * | 5/2006 | Park .................... 315/248 |
| 7,759,878 B2 | * | 7/2010 | Yufuku et al. ........... 315/291 |
| 2003/0062852 A1 | | 4/2003 | Park et al. |
| 2005/0035721 A1 | | 2/2005 | Park |

FOREIGN PATENT DOCUMENTS

| | | |
|---|---|---|
| EP | 1507283 A2 | 2/2005 |
| KR | 10-2001-0019884 A | 3/2001 |
| KR | 10-20010050569 A | 6/2001 |
| KR | 10-0565343 B1 | 3/2006 |
| KR | 10-0864657 B1 | 10/2008 |
| WO | WO 03/107725 A1 | 12/2003 |
| WO | WO 03107725 A1 * | 12/2003 |

OTHER PUBLICATIONS

European Search Report dated Apr. 11, 2012 for Application No. 10168778.8, 7 pages.

* cited by examiner

*Primary Examiner* — Douglas W Owens
*Assistant Examiner* — Amy Yang
(74) *Attorney, Agent, or Firm* — Fish & Richardson P.C.

(57) ABSTRACT

An electrodeless lighting system and its control method are disclosed. When the electrodeless lighting system starts, a larger amount of filament current of a magnetron is applied to stably drive the magnetron, and when the electrodeless lighting system operates normally, a smaller amount of filament current is applied, thus avoiding interference with a wireless LAN, lengthening a life span of the magnetron, reducing noise, and improving an operational efficiency of the electrodeless lighting system.

7 Claims, 6 Drawing Sheets

ELECTRODELESS LIGHTING SYSTEM AND CONTROL METHOD THEREOF

BACKGROUND OF THE INVENTION

1. Field of the Invention

The present invention relates to an electrodeless lighting system and a control method thereof capable of avoiding communication interference with a wireless LAN by changing a filament current, and lengthening a life span of a magnetron.

2. Description of the Related Art

Recently, an electrodeless lighting system using microwave has been developed, and because the electrodeless lighting system has a long life span and good luminous efficiency and characteristics, it is increasingly used.

Figure 3:
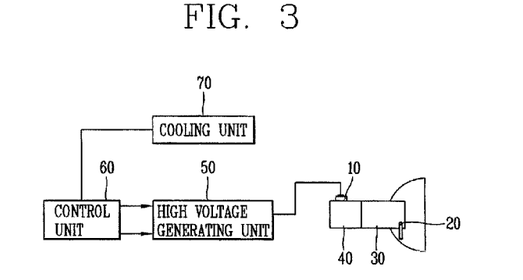
FIG. 3 is a schematic block diagram showing the structure of a general electrodeless lighting system.

As shown in FIG. 3, a general electrodeless lighting system includes a magnetron 10 generating microwave (or ultrahigh frequency), a resonator 30 including an electrodeless light bulb 20 therein, resonating microwave supplied from the magnetron 10, and having a mesh form to discharge light, which has been converted from microwave energy in the light bulb, to its maximum level to outside, a wave guide 40 guiding the microwave generated by the magnetron 10 to the resonator 30, a high voltage generating unit 50 increasing external power into a high voltage and supplying the high voltage to the magnetron 10, a cooling unit 70 preventing the magnetron 10 and the high voltage generating unit 50 from being overheated due to heat generated by themselves, and a control unit controlling the high voltage generating unit 50 applying a high voltage to the magnetron 10 and the cooling unit 70.

The high voltage generating unit 50 increases AC power applied from an external source upon receiving a driving signal outputted from the control unit 60, and supplies the increased high voltage to the magnetron 10. The magnetron 10 is oscillated by the high voltage outputted from the high voltage generating unit 50 to concentrate the microwave having a very high frequency to the electrodeless light bulb within the resonator 30 through the wave guide 40, and accordingly, the electrodeless light bulb 20 absorbs the microwave energy to generate light.

Meanwhile, a wireless LAN is one of communication network schemes allowing connectors to wirelessly communicate with each other by using a radio frequency. According to an IEEE standard, the wireless LAN uses a high frequency of 2.4 GHz, 5 GHz, or the like. However, these microwave signals may affect other nearby electronic devices or may be affected by them to cause malfunction or the like, so the use of the high frequency signals is limited in airplanes, hospitals, laboratories, and the like.

In the related art, in order to secure an initial maneuverability of the electrodeless lighting system, a filament is sufficiently heated with a filament current and then voltage is applied to a magnetron high voltage driving unit in consideration of diurnal variations, e.g., temperature characteristics, of the magnetron.

However, the related art electrodeless lighting system and control method thereof do not have a function of regulating the amount of filament electron emission, causing interference with the wireless LAN.

In addition, in the related art electrodeless lighting system and control method thereof, there is not difference between an initial heating current and an operation current, so communication interference with the wireless LAN is generated due to noise generated from the electrodeless lighting system.

SUMMARY OF THE INVENTION

Therefore, in order to address the above matters, the various features described herein have been conceived.

An aspect of the present invention provides an electrodeless lighting system capable of stably driving a magnetron during an initial starting stage, and controlling a filament current to avoid interference with a wireless LAN during a normal status operation, and a control method thereof.

Another aspect of the present invention provides an electrodeless lighting system capable of avoiding interference with a wireless LAN by making a filament current of a magnetron during the initial starting stage and a filament current of the magnetron during the normal state operation different, and lengthening a life span of the magnetron, and a control method thereof.

Another aspect of the present invention provides an electrodeless lighting system capable of reducing noise and improving efficiency by reducing a filament current.

According to an aspect of the present invention, there is provided an electrodeless lighting system including: a magnetron having a filament therein and generating microwave; a resonator having an electrodeless light bulb therein and resonating microwave generated from the magnetron; a wave guide guiding the microwave generated from the magnetron to the resonator; and a control unit applying a filament current greater than a pre-set first current to the filament during an initial starting stage and changing the filament current such that the filament current is the same as or smaller than a second current which is smaller than the first current, and applying the changed filament current to the filament in a pre-set normal state.

The control unit may compare the number of pulses of light of the electrodeless light bulb and a pre-set reference number of pulses, and when the number of pulses of the light in the electrodeless light bulb is greater than the reference number of pulses, the control unit may determine that the electrodeless light bulb is in a normal state.

When a duration in which the current greater than first current is more than a pre-set reference duration, the control unit may apply a high voltage to the magnetron and determine whether or not the electrodeless light bulb is in a normal state by comparing the number of pulses.

According to another aspect of the present invention, there is provided an electrodeless lighting system including: a rectifying unit converting commercial AC power to generate a DC voltage; a driving unit converting the DC voltage to generate a filament current and a driving voltage; a magnetron oscillated by the filament current and the driving voltage outputted from the driving unit to output microwave to a wave guide; and a control unit outputting a first control signal for converting the DC voltage to the filament current and a second control signal converting the DC voltage into the driving voltage. Here, during an initial starting stage, the control unit may apply a filament current of a pre-set first current or larger to a filament and maintain the filament current, and at the pre-set normal state, the control unit may change the filament current such that it is a second current or smaller than a second current which is smaller than the first current.

The driving unit may include: a first inverter unit varying the frequency of the DC voltage based on the first control signal and converting the same into a first AC voltage; a second inverter unit varying the frequency of the DC voltage based on the second control signal and converting the same into a second AC voltage; a first conversion unit converting the first AC voltage to generate the filament current; and a second conversion unit converting the second AC voltage to generate the driving voltage. The driving unit may further include: a high voltage generating unit increasing the driving voltage outputted from the second conversion unit into a high voltage and applying the increased high voltage to the magnetron.

The electrodeless lighting system may further include: a power factor compensation unit connected between the rectifying unit and the driving unit and compensating for a power factor of the DC voltage outputted from the rectifying unit.

The electrodeless lighting system may further include a light detection unit detecting light of the electrodeless light bulb according to microwave outputted to the wave guide, and when the number of pulses of the detected light is greater than the reference number of pulses, and when the number of pulses of the detected light is greater than the reference number of pulses, the control unit determines that the electrodeless light bulb is in a normal state. In this case, when a duration in which the current of the first current or larger exceeds a pre-set reference duration, the control unit may apply a high voltage to the magnetron and determine whether or not the electrodeless light bulb is in a normal state by comparing the number of pulses.

The electrodeless lighting system may further include: an input voltage detection unit detecting an input voltage inputted to the rectifying unit; and an input current detection unit detecting an input current inputted to the rectifying unit.

According to another aspect of the present invention, there is provided a method for controlling an electrodeless lighting system including: an initial starting step of applying a filament current of a pre-set first current or larger of a magnetron; a normal state determining step of determining whether or not the electrodeless lighting system has reached a normal state; and a filament current changing step of changing the filament current such that it is a second current, which is smaller than the first current, or smaller when the electrodeless lighting system has reached the normal state.

Here, the normal state determining step may include: an initial start time determining step of applying the filament current of the pre-set first current or larger to a filament and determining whether or not a pre-set reference duration has passed by; a driving voltage application step of applying a high driving voltage to the magnetron when the duration in which the current of the first current or larger than the first current is applied exceeds the pre-set reference duration; a light detection step of detecting light of the electrodeless light bulb according to microwave outputted from the magnetron to the wave guide; and a pulse number comparing step of comparing the number of pulses of the detected light and a pre-set reference number of pulses, wherein when the number of pulses of the detected light is larger than the reference number of pulses, it is determined that the electrodeless lighting system is in a normal state.

The method for controlling an electrodeless lighting system may further include: an input power maintaining step of uniformly maintaining entire power applied to the magnetron, and in the input power maintaining step, the driving voltage of the magnetron is increased as high as the reduced filament current and supplied.

According to another aspect of the present invention, there is provided a method for controlling an electrodeless lighting system, including: a first step of applying a filament current of a pre-set first current or larger of a magnetron to a filament to start the electrodeless lighting system; a second step of determining whether or not a pre-set reference duration has passed by after the first step; a third step of applying a high driving voltage to the magnetron when the pre-set reference duration has passed by according to the determination result of second step; a fourth step of detecting light of an electrodeless light bulb according to microwave outputted to a wave guide from the magnetron; a fifth step of comparing the number of pulses of the detected light and a pre-set reference number of pulses; a sixth step of determining that the electrodeless lighting system is in a normal state when the number of pulses of the detected light is larger than the reference number of pulses according to a comparison result of the fifth step; and a seventh step of changing the filament current such that the filament current is the same or smaller than a second current which is smaller than the first current.

The method for controlling the electrodeless lighting system may further include: an eighth step of increasing a driving voltage of the magnetron such that it is as high as the reduced filament current and supplying the same.

According to the exemplary embodiments of the present invention, when the electrodeless lighting system starts, the magnetron can be stably driven, and while the electrodeless lighting system is operating normally, interference with a wireless LAN can be avoided.

In addition, because the filament current of a magnetron during the initial starting stage and the filament current of the magnetron during the normal state operation are different, the advantages of minimizing undesirable interference with the wireless LAN and lengthening the life span of the magnetron can be achieved.

Also, because the filament current is reduced, noise can be reduced and efficiency can be improved.

The foregoing and other objects, features, aspects and advantages of the present invention will become more apparent from the following detailed description of the present invention when taken in conjunction with the accompanying drawings.

DETAILED DESCRIPTION OF THE INVENTION

First, the relationship between a wireless LAN and an electrodeless lighting system and the characteristics according to a filament current will now be described.

Figure 1:
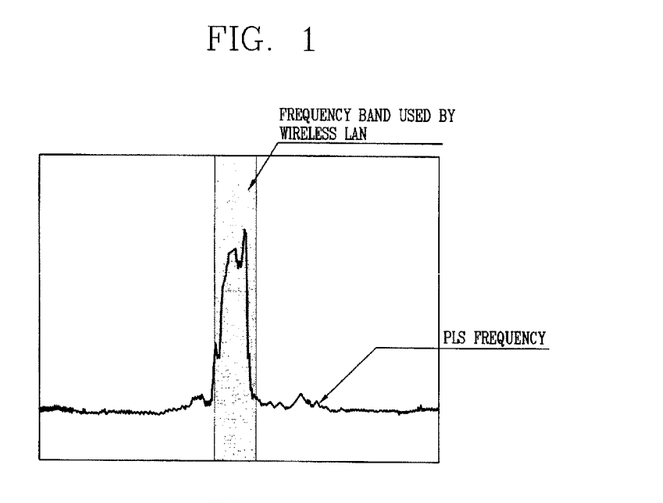
FIG. 1 illustrates communication interference between a wireless LAN and an electrodeless lighting system.
Figure 2:
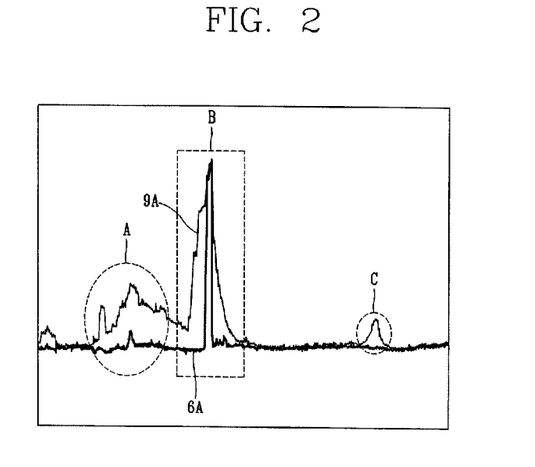
FIG. 2 illustrates the characteristics according to a filament current

As shown in FIG. 1, a wireless LAN uses a wireless LAN use frequency band of 2.4 GHz to 2.5 GHz of an ISM band (industrial scientific and medical radio band). Microwave generated from an electrodeless lighting system ranges from 2.1 GHz to 2.8 GHz. Thus, the wireless LAN use frequency band and the microwave generated from the electrodeless lighting system causes communication interference over about 7 ch. Meanwhile, as shown in FIG. 2, such communication interference is affected by a filament current of a magnetron in the electrodeless lighting system. With reference to FIG. 2, compared with a filament current of 6 A, a filament current of 9 A has a larger bandwidth in a region B, and much noise is generated in regions A and C.

The electrodeless lighting system and its control method according to an exemplary embodiment of the present invention will now be described.

Figure 4:
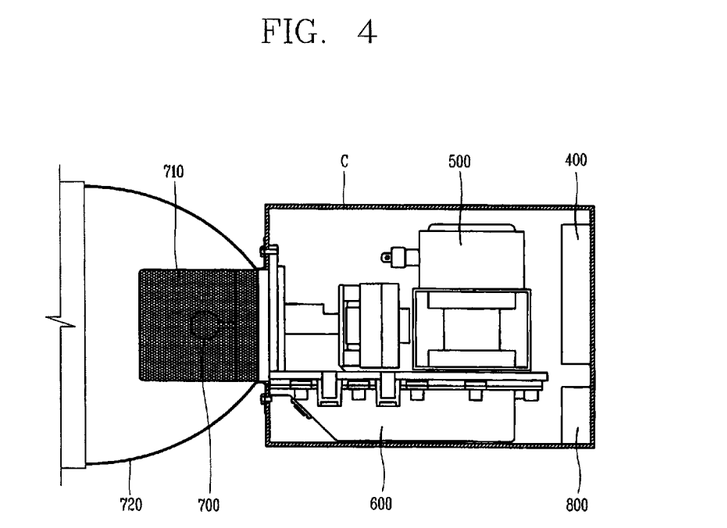
FIG. 4 is a schematic front view of an electrodeless lighting system according to an exemplary embodiment of the present invention.

With reference to FIG. 4, the electrodeless lighting system according to an exemplary embodiment of the present invention includes a magnetron 500 including a filament therein and generating microwave, a resonator 710 including an electrodeless light bulb 700 and resonating microwave generated from the to magnetron 500, a wave guide 600 guiding the microwave generated by the magnetron to the resonator 710, and a control unit 800 applying a filament current of a pre-set first current or larger to the filament during an initial starting stage and changing the filament current such that the filament current is the same or smaller than a second current which is smaller than the first current and applying the changed filament current to the filament.

The electrodeless lighting system further includes a casing (C) and a high voltage generating unit installed in the internal space of the casing (C) and generating a high voltage.

The magnetron 500 is installed in the internal space of the casing (C) and generates microwave having a high frequency as a high voltage generated from the high voltage generating unit is applied thereto.

The wave guide 600 is installed in the internal space of the casing (C) and coupled to the magnetron 500 to guide microwave having a high frequency which has been oscillated from the magnetron 500. The wave guide 600 includes a first wave guide part having a rectangular wave guide space, to which the magnetron 500 is coupled, and a second wave guide part having a continuous wave guide space formed as the second wave guide part is bent from the first wave guide part and communicating with the resonance space of the resonator 710. Of course, the wave guide 600 is formed linearly. The magnetron 500 may be coupled to one side of the wave guide 600 and the wave guide space of the wave guide 600 may be connected with the resonance space of the resonator 700.

The resonator 710 is installed at an outer side of the casing (C) and coupled to an outlet of the wave guide 600 to shield an external discharge of to microwave to form a resonance mode. The electrodeless light bulb 700 is disposed at an inner side of the resonator 710 at an outer side of the casing (C) and contains a luminous material to be excited by microwave to emit light. The resonator 710 resonates microwave supplied from the magnetron 500 and has a mesh form to discharge to its maximum level light which has been converted is from microwave energy by the electrodeless light bulb 700.

The electrodeless lighting system includes a reflection shade 720 installed at the outer side of the casing (C), accommodating the resonator 710, and concentrating light emitted from the electrodeless light bulb 700 to a front side.

As shown in FIG. 4, when the wave guide 600 includes the first and second wave guide parts, the magnetron 500 is coupled such that a lengthwise direction of an antenna part is perpendicular to a lengthwise direction of the first guide part, and the resonator 710 is coupled such that its axial center is perpendicular to the lengthwise direction of the second wave guide part. Thus, the installation direction of the magnetron 500 and that of the resonator 710 are substantially perpendicular.

The electrodeless lighting system further includes a driving unit 400 generating a filament current and a driving voltage. The driving unit 400, installed at the inner side of the casing (C), includes the high voltage generating unit.

The control unit 800 is electrically connected with the driving unit 400, and as shown in FIG. 4, the control unit 800 may have a form of a board or configured to be hermetically closed and installed at the inner side or outer side of the casing (C).

Figure 8:
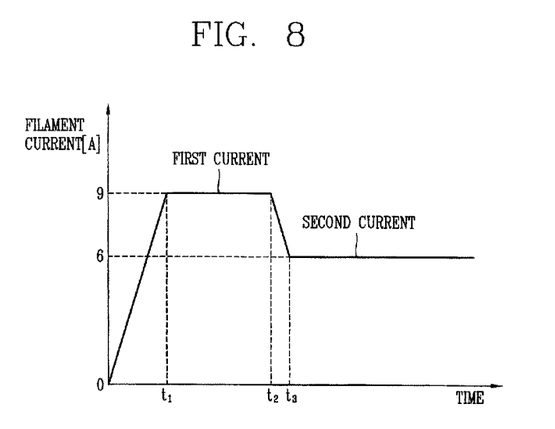
FIG. 8 is a graph showing a change in the filament current over time according to an exemplary embodiment of the present invention.

As shown in FIG. 8, during an initial starting stage, the control unit 800 applies a first current, e.g., a current of 9 A or larger, to the filament disposed within the magnetron (0~t1) and determines whether or not the electrodeless lighting system has reached a normal state (t1~t2). When the electrodeless lighting system is in a normal state, the control unit 800 reduces the filament current to a second current, e.g., 6 A, or smaller, and applies the same (t2~t3).

The control unit compares the number of pulses of light from the electrodeless light bulb and a pre-set reference number of pulses. When the number of pulses of light from the electrodeless light bulb is greater than the reference number of pulses according to the comparison result, the control unit determines that the electrodeless lighting system is in a normal state.

Also, when the duration in which the current of the first current or larger is applied exceeds a pre-set reference duration, the control unit 800 applies a high voltage to the magnetron 500, and determines whether or not the electrodeless lighting system is in a normal state by comparing the number of pulses.

The electrodeless lighting system may further include a cooling unit (not shown) for preventing overheating due to heat generated from the magnetron 500 and the high voltage generating unit, and in this case, the control unit controls the high voltage generating unit applying a high voltage to the magnetron 500 and the cooling unit.

Figure 5:
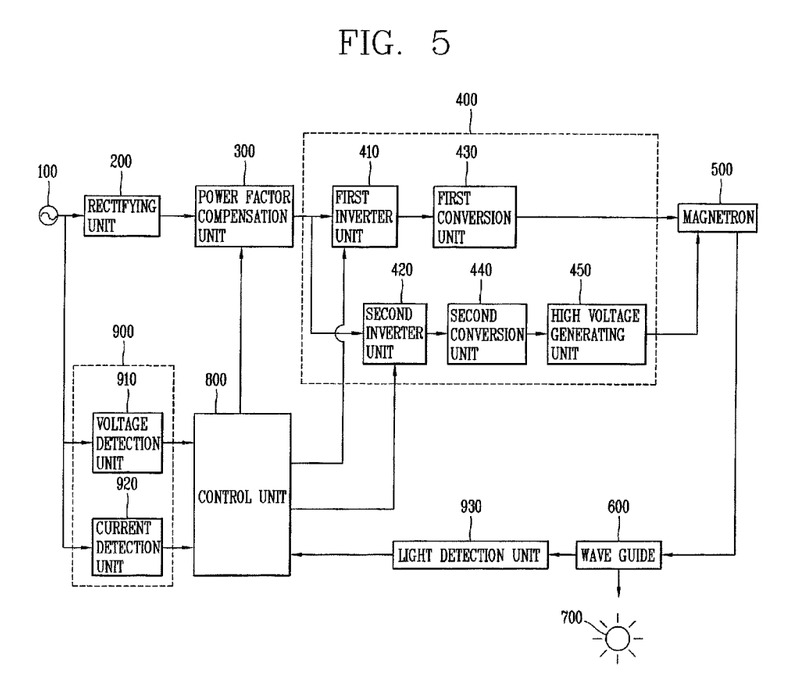
FIG. 5 is a schematic block diagram showing the structure of the electrodeless lighting system according to an exemplary embodiment of the present invention.

With reference to FIG. 5, the electrodeless lighting system includes a rectifying unit 200 generating a DC voltage by converting commercial AC power 100, a driving unit 400 generating a filament current and driving voltage by converting the DC voltage, a magnetron 500 oscillated by the filament current and the driving voltage outputted from the driving unit 400 to output microwave to the wave guide, and a control unit 800 outputting a first control signal for converting the DC voltage into the filament current and a second control signal for converting the DC voltage into the driving voltage. Here, the filament is provided in the magnetron 500.

The rectifying unit 200 receives the commercial AC power 100 by using a bridge circuit or the like and converts it into a DC voltage. In this case, the converted DC voltage is a pulsating wave. The rectifying unit 200 includes a smoothing unit, and the smoothing unit is configured as a semiconductor device such as a capacitor to smooth the pulsating wave into a DC voltage. Also, the driving unit 400 receives the smoothed DC voltage.

The driving unit 400 converts the DC voltage inputted from the rectifying unit 200 into the filament current of the magnetron and the driving voltage for driving the magnetron based on control signals outputted from the control unit 800. In this case, the control signal is a frequency control signal or a duty control signal. The driving unit 400 receives a first control signal from the control unit 800, converts the DC voltage which has been received from the rectifying unit 200 based on the first control signal, and supplies the converted DC voltage to the filament of the magnetron. Also, the driving unit 400 receives the second control signal from the control unit 800, converts the DC voltage which has been received from the rectifying unit 200 based on the second control signal, and supplies a driving voltage for driving the magnetron.

The control unit 800 applies the filament current of the pre-set current or larger to the filament during the initial starting stage and maintains it, and changes the filament current to the second current, which is smaller than the first current, or smaller in a pre-set normal state. In this case, 9 to 11 A is used as the first current, and 4 to 7 A is used as the second current. Namely, the maneuverability of the electrodeless lighting system is secured during the initial starting stage, and a slightly higher current of 9 to 11 A is applied to the filament within the magnetron 500 in consideration of diurnal variations such as a change according to temperature characteristics of the magnetron. As shown in FIG. 8, the control unit applies a first current, e.g., a current of 9 A or larger, to the filament present within the magnetron during the initial starting stage (0~t1) and determines whether or not the electrodeless lighting system has reached a normal state (t1~t2). When the electrodeless lighting system is in a normal state, the control unit reduces the filament current such that it is the same or smaller than the second current, e.g., 6 A, and applies the same (t2~t3).

The driving unit 400 includes a first inverter unit 410 for varying the frequency of the DC voltage and converting it into a first AC voltage based on the first control, a second inverter unit 420 for varying the frequency of the DC voltage into a second AC voltage and converting it into a second AC voltage based on the second control signal, a first conversion unit 430 for converting the first AC voltage to generate the filament current, and a second conversion unit 440 for converting the second AC voltage to generate the driving voltage. Of course, the first inverter unit 410 and the second inverter unit 420 may be configured as a single inverter unit. Also, the first conversion unit 430 and the second conversion unit 440 may be configured as a single conversion unit, namely, through a transformer. The driving unit 400 may further includes a high voltage generating unit 450 for increasing the driving voltage outputted from the second conversion unit 440 into a high voltage and applying the same to the to magnetron.

The first inverter unit 410 includes switching elements such as insulated gate bipolar transistors (IGBTs). The first inverter unit 410 receives a first control signal, a switching control signal, such as a frequency control signal, a duty control signal, or the like, from the control unit 800 and converts the DC voltage inputted from the rectifying unit 200 or from the power factor compensating unit 300 into a first AC voltage based on the first control signal. The first conversion unit 430 is a general transformer which converts the first AC voltage and supplies current to the filament of the magnetron according to the first inverter unit 410.

The second inverter unit 420 are also configured to include switching elements such as IGBTs. The second inverter unit 420 receives a second control signal, a switching control signal, such as the frequency control signal, the duty control signal, or the like, and converts the DC voltage inputted from the rectifying unit 200 or the power factor compensating unit 300 based on the second control signal. Subsequently, the second conversion unit 440 is a general transformer which converts the second AC voltage according to the second inverter unit 420 to supply a driving voltage for driving the magnetron.

The high voltage generating unit 450 increases the magnetron driving voltage which has been converted by the second conversion unit 550 and applies the increased high voltage to the magnetron 500.

The electrodeless lighting system according to an exemplary embodiment of the present invention may further include the power factor compensating unit 300 connected between the rectifying unit 200 and the driving unit 400 and r compensating for a power factor of the DC voltage outputted from to the rectifying unit 200. In this case, the control unit 800 may store power factor compensation data in advance. Namely, the control unit 800 receives the commercial AC power 100, detects a variation of the commercial AC power 100 and applies corresponding power factor compensation data to the power factor compensating unit 300. Then, the power factor compensating unit 300 compensates for a power factor of the DC voltage outputted from the rectifying unit 200 by using the power factor compensation data. Also, the driving unit 400 receives the power factor-compensated DC voltage from the power factor compensating unit 300.

Also, the electrodeless lighting system according to an exemplary embodiment of the present invention may further include an input voltage detection unit 910 for detecting an input voltage inputted to the rectifying unit 200 and an input current detection unit 920 for detecting an input current inputted to the rectifying unit 200. The control unit 800 controls the power factor compensation unit 300 and the driving unit 400 including the first inverter unit 410 and the second inverter unit 420 based on the detected input voltage and input current.

The electrodeless lighting system according to an exemplary embodiment of the present invention may further include a light detection unit 930 for detecting light of the electrodeless light bulb according to microwave outputted to the wave guide. The light detection unit 930 may be a photo transistor. The photo transistor may be installed at a bulb stage generating light through the electrodeless light bulb and counts the number of pulses of the light according to a rotation. In this case, the control unit 800 previously sets a reference number of pulses and compares the number of pulses of the detected light with the pre-set reference number of pulses. Upon comparison, when the number of pulses of the detected light is greater than the reference number of pulses, the control unit 800 determines that the electrodeless lighting system is in a normal state. Here, the reference number of pulses may be set to vary depending on the characteristics of the electrodeless lighting system.

The control unit 800 previously sets a reference duration. When a duration in which the current of the first current or larger is applied exceeds the pre-set reference duration, the control unit 800 applies a high driving voltage to the magnetron and determines whether or not the electrodeless lighting system is in a normal state by comparing the number of pulses. Namely, for example, the control unit 800 may set the reference duration as 4 seconds, and when four seconds has passed by, the control unit 800 outputs the second control signal to the second inverter unit 420 to apply a high voltage to the magnetron 500. And then, the control unit 800 determines whether or not the electrodeless lighting system has reached a stable lighting state by using the light detection unit 930.

When it is determined that the electrodeless lighting system has reached a stable lighting state, the control unit 800 reduces the filament current of the magnetron through the first control signal and supplies the current of the second current or smaller. Namely, the control unit 800 changes the filament current of the magnetron from a range of 9 to 11 A to a range of 4 to 7 A. Accordingly, the frequency band of microwave outputted from the magnetron can be reduced and noise can be also reduced. Namely, as shown in FIG. 2, when the filament current is reduced from 9 A to 6 A, nose in the regions A and C can be attenuated, the frequency band in the region B can be reduced, and a frequency interference with a wireless LAN can be avoided.

Figure 6:
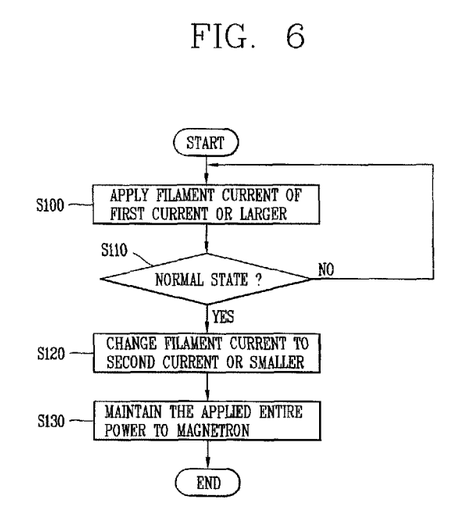
FIG. 6 is a flow chart illustrating the process of a method for controlling an electrodeless lighting system according to an exemplary embodiment of the present invention.

With reference to FIG. 6, a method for controlling an electrodeless lighting system according to an exemplary embodiment of the present invention includes an initial starting step (S100) of applying a filament current of a pre-set first current or larger of a magnetron; a normal state determining step (S110) of determining whether or not the electrodeless lighting system has reached a normal state; and a filament current changing step (S120) of changing the filament current such that it is a second current, which is smaller than the first current, or smaller when the electrodeless lighting system has reached the normal state. The configuration of the device is referred to FIGS. 4 and 5.

Here, the normal state determining step (S110) may include: an initial start time determining step (not shown) of applying the filament current of the pre-set first current or larger to a filament and determining whether or not a pre-set reference duration has passed by; a driving voltage application step (not shown) of applying a high driving voltage to the magnetron when the duration in which the current of the first current or larger than the first current is applied exceeds the pre-set reference duration; a light detection step (not shown) of detecting light of the electrodeless light bulb according to microwave outputted from the magnetron to the wave guide; and a pulse number comparing step (not shown) of comparing the number of pulses of the detected light and a pre-set reference number of pulses, wherein when the number of pulses of the detected light is larger than the reference number of pulses, it is determined that the electrodeless lighting system is in a normal state.

The method for controlling an electrodeless lighting system according to an exemplary embodiment of the present invention may further include: an input power maintaining step (S130) of uniformly maintaining entire power applied to the magnetron, and in the input power maintaining step (S130), the driving voltage of the magnetron is increased as high as the reduced filament current and supplied.

During the initial starting stage, the filament current of the pre-set first current or larger is applied to a filament and the filament current is maintained (S100). In this case, as the first current, 9 to 11 A may be used. Namely, the maneuverability of the electrodeless lighting system is secured during the initial starting stage, and the slightly higher current of 9 to 11 A is applied to the filament within the magnetron 500 in consideration of diurnal variations such as a change according to temperature characteristics of the magnetron.

In the normal state determining step (S110), light according to microwave outputted from the magnetron is detected, and the number of pulses of the detected light and the pre-set reference number of pulses are compared. Upon comparison, when the number of pulses of the detected light is larger than the reference number of pulses, it is determined that the electrodeless lighting system is in a normal state. Here, the reference number of pulses may be set to vary depending on the characteristics of the electrodeless lighting system.

In the normal state determining step (S110), when the duration in which the current of the first current or larger is applied exceeds the pre-set reference duration, a high voltage is applied to the magnetron, and whether or not the electrodeless lighting system is in a normal state by comparing the number of pulses. For example, when the reference duration is set to 4 seconds, and after four seconds has passed by, a high voltage is applied to the magnetron according to the second control signal. And then, the light is detected to determine whether or not the electrodeless lighting system is in a normal state or has reached a stable lighting state.

When it is determined that the electrodeless lighting system has reached a stable lighting state, the filament current of the magnetron is reduced through the first control signal and a current of the second current or smaller is supplied (S120). Here, as the second current, 4 to 7 A may be used. Namely, the filament current of the magnetron is changed from a range of 9 to 11 A to a range of 4 to 7 A. Accordingly, the frequency band of microwave outputted from the magnetron can be reduced and noise can be also reduced. Namely, as shown in FIG. 2, when the filament current is reduced from 9 A to 6 A, nose in the regions A and C can be attenuated, the frequency band in the region B can be reduced, and a frequency interference with a wireless LAN can be avoided.

And then, the entire power applied to the magnetron is uniformly maintained (S130). The driving voltage of the magnetron is increased to as high as the reduced filament current and supplied. Accordingly, a life span of the magnetron can be lengthened, noise can be reduced, and the operation efficiency of the electrodeless lighting system can be improved.

Figure 7:
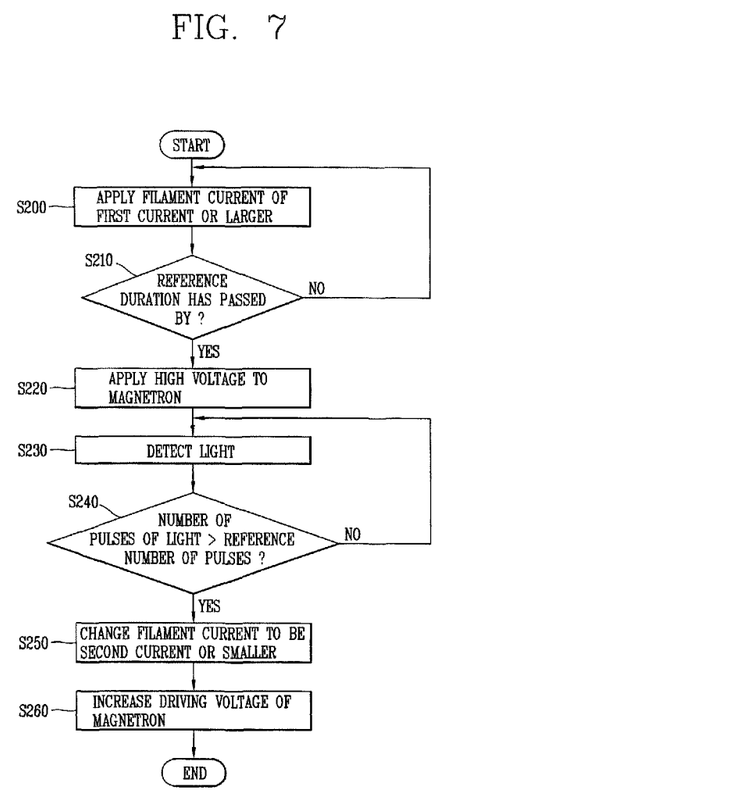
FIG. 7 is a flow chart illustrating the process of a method for controlling an electrodeless lighting system according to another exemplary embodiment of the present invention.

With reference to FIG. 7, a method for controlling an electrodeless lighting system according to another exemplary embodiment of the present invention includes: a first step (S200) of applying a filament current of a pre-set first current or larger of a magnetron to a filament to start the electrodeless lighting system; a second step (S200) of determining whether or not a pre-set reference duration has passed by after the first step; a third step (S300) of applying a high driving voltage to the magnetron when the pre-set reference duration has passed by according to the determination result of second step; a fourth step (S400) of detecting light of an electrodeless light bulb according to microwave outputted to a wave guide from the magnetron; a fifth step (S500) of comparing the number of pulses of the detected light and a pre-set reference number of pulses; a sixth step (S600) of determining that the electrodeless lighting system is in a normal state when the number of pulses of the detected light is larger than the reference number of pulses according to a comparison result of the fifth step; and a seventh step (S700) of changing the filament current such that the filament current is the same or smaller than a second current which is smaller than the first current. Also, the method for controlling the electrodeless lighting system may further include: an eighth step (S260) of increasing a driving voltage of the magnetron such that it is as high as the reduced filament current and supplying the same.

During the initial starting stage, the filament current of the pre-set first current or larger is applied to the filament and maintained (S200), and in the pre-set normal state, the filament current is changed to the second current, which is smaller than the first current, or smaller (S120). In this case, as the first current, 9 to 11 A may be used. Namely, the maneuverability of the electrodeless lighting system is secured during the initial starting stage, and the slightly higher current of 9 to 11 A is applied to the filament within the magnetron 500 in consideration of diurnal variations such as a change according to temperature characteristics of the magnetron.

And then, it is determined whether or not the duration in which the current of the first current or larger is applied exceeds the pre-set reference duration (S210). When the duration in which the current of the first current or larger is applied exceeds the pre-set reference duration, a high voltage is applied to the magnetron (S220, and whether or not the electrodeless lighting system is in a normal state by comparing the number of pulses. For example, when the reference duration is set to 4 seconds, and after four seconds has passed by, a high voltage is applied to the magnetron according to the second control signal. And then, the light is detected to determine whether or not the electrodeless lighting system is in a normal state or has reached a stable lighting state. In other words, light according to microwave outputted from the magnetron is detected (S230), and the number of pulses of the detected light is compared with the pre-set reference number of pulses (S240). Upon comparison, when the number of pulses of the detected light is greater than the reference number of pulses, it is determined that the electrodeless lighting system is in a normal state. Here, the reference number of pulses may be set to vary depending on the characteristics of the electrodeless lighting system.

When it is determined that the electrodeless lighting system has reached a stable lighting state, the filament current of the magnetron is reduced through the first control signal and a current of the second current or smaller is supplied (S250). Here, as the second current, 4 to 7 A may be used. Namely, the filament current of the magnetron is changed from a range of 9 to 11 A to a range of 4 to 7 A. Accordingly, the frequency band of microwave outputted from the magnetron can be reduced and noise can be also reduced. Namely, as shown in FIG. 2, when the filament current is reduced from 9 A to 6 A, nose in the regions A and C can be attenuated, the frequency band in the region B can be reduced, and a frequency interference with a wireless LAN can be avoided.

And then, the entire power applied to the magnetron is uniformly maintained. The driving voltage of the magnetron is increased to as high as the reduced filament current and supplied (S260). Accordingly, a life span of the magnetron can be lengthened, noise can be reduced, and the operation efficiency of the electrodeless lighting system can be improved.

As so far described, in the electrodeless lighting system and its control method according to the exemplary embodiments of the present invention, during the initial starting stage, a large filament current of the magnetron is applied to stably drive the magnetron, and during a normal state operation, a reduced filament current is applied, thus avoiding communication interference with a wireless LAN. Also, because the filament current is changed to be smaller, the life span of the magnetron can be lengthened and noise can be reduced. In addition, instead of reducing the filament current of the magnetron, the high driving voltage applied to the magnetron is increased and supplied, thus improving the operation efficiency of the electrodeless lighting system.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electrodeless lighting system comprising:
   a magnetron having a filament therein and generating microwave;
   a resonator having an electrodeless light bulb therein and resonating microwave generated from the magnetron;
   a wave guide guiding the microwave generated from the magnetron to the resonator; and
   a control unit configured to:
      apply a filament current which is the same as or greater than a pre-set first current to the filament during an initial starting stage,
      compare a number of pulses of light in the electrodeless light bulb with a pre-set reference number of pulses,
      determine that the electrodeless light bulb is in a pre-set normal state when the number of pulses of the light in the electrodeless light bulb is greater than the reference number of pulses, and
      based on the determination that the electrodeless light bulb is in a pre-set normal state, change and apply the filament current which is the same as or smaller than a second current to the filament, wherein the second current is smaller than the first current.

2. The electrodeless lighting system of claim 1, wherein when a duration in which the filament current greater than the first current is longer than a pre-set reference duration, the control unit is configured to apply a high voltage to the magnetron before determining whether or not the electrodeless light bulb is in the normal state by comparing the number of pulses.

3. The electrodeless lighting system of claim 1, wherein the first current is 9 to 11 A and the second current is 4 to 7 A.

4. A method for controlling an electrodeless lighting system, the system comprising a magnetron having a filament therein and generating microwave, a resonator having an electrodeless light bulb therein and resonating microwave generated from the magnetron, and a wave guide guiding the microwave generated from the magnetron to the resonator, the method comprising:
   applying a filament current that is the same as or larger than a pre-set first current to the magnetron;
   determining that the electrodeless lighting system is in a pre-set normal state when the number of pulses of the light in the electrodeless light bulb is greater than the reference number of pulses; and
   based on determining that the electrodeless lighting system is in a pre-set normal state, changing the filament current such that it is a second current, which is smaller than the first current,
   wherein determining that the electrodeless lighting system is in a pre-set normal state includes:
   detecting light of the electrodeless light bulb according to microwave outputted from the magnetron to the wave guide, and
   comparing the number of pulses of the detected light and a pre-set reference number of pulses.

5. The method of claim 4, further comprising:
   applying the filament current that is the same as or larger than the pre-set first current to a filament;
   determining whether or not a pre-set reference duration has passed by; and
   applying a high driving voltage to the magnetron when the duration, in which the current is the same as or larger than the first current, exceeds the pre-set reference duration.

6. The method of claim 4, further comprising:
   an input power maintaining step of uniformly maintaining entire power applied to the magnetron.

7. The method of claim 4, wherein the first current is 9 to 11 A and the second current is 4 to 7 A.

* * * * *